Oct. 14, 1930. P. RYM 1,778,403
ANIMAL TRAP
Filed Feb. 4, 1928 2 Sheets-Sheet 1
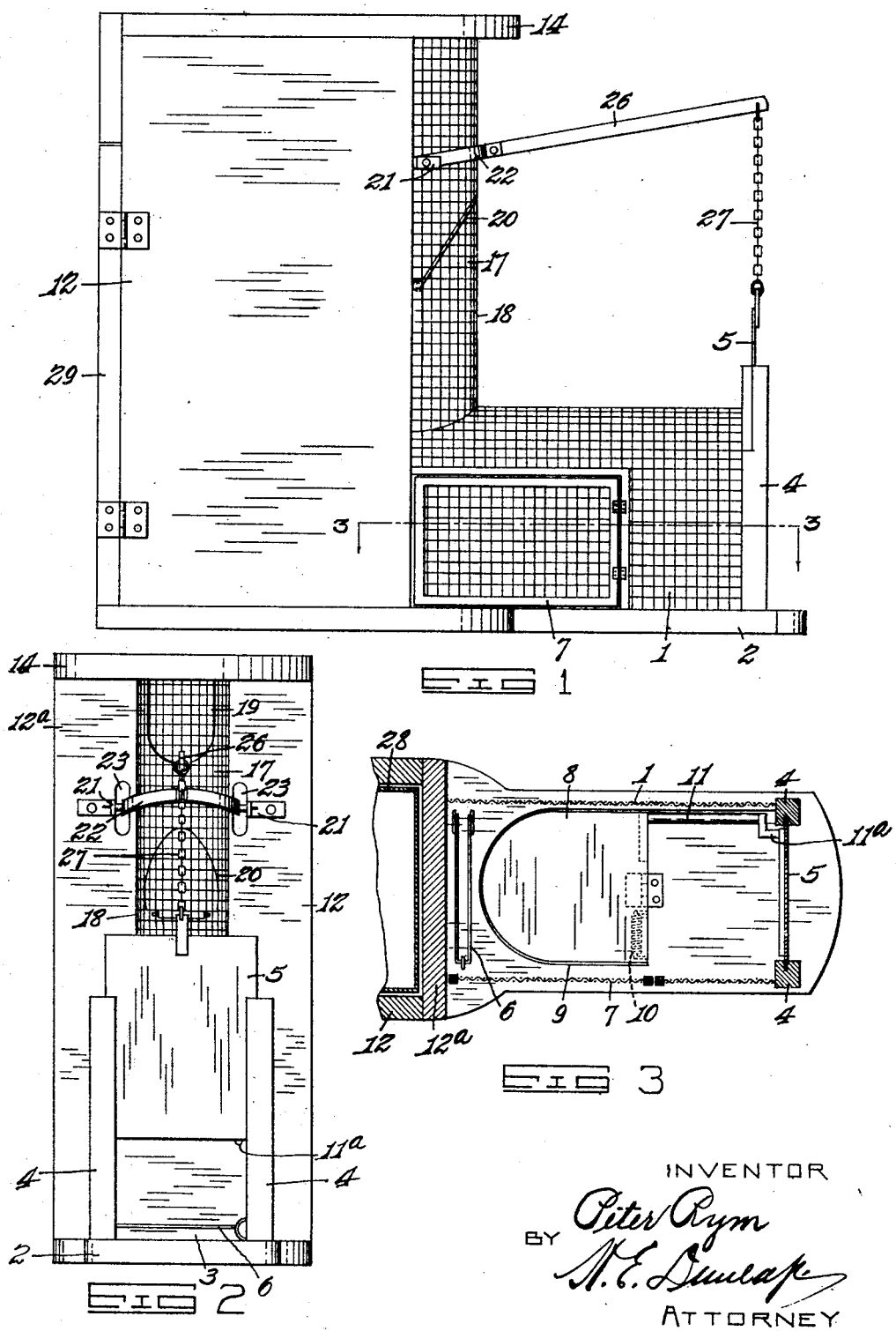
INVENTOR
Peter Rym
BY
N. E. Dunlap
ATTORNEY

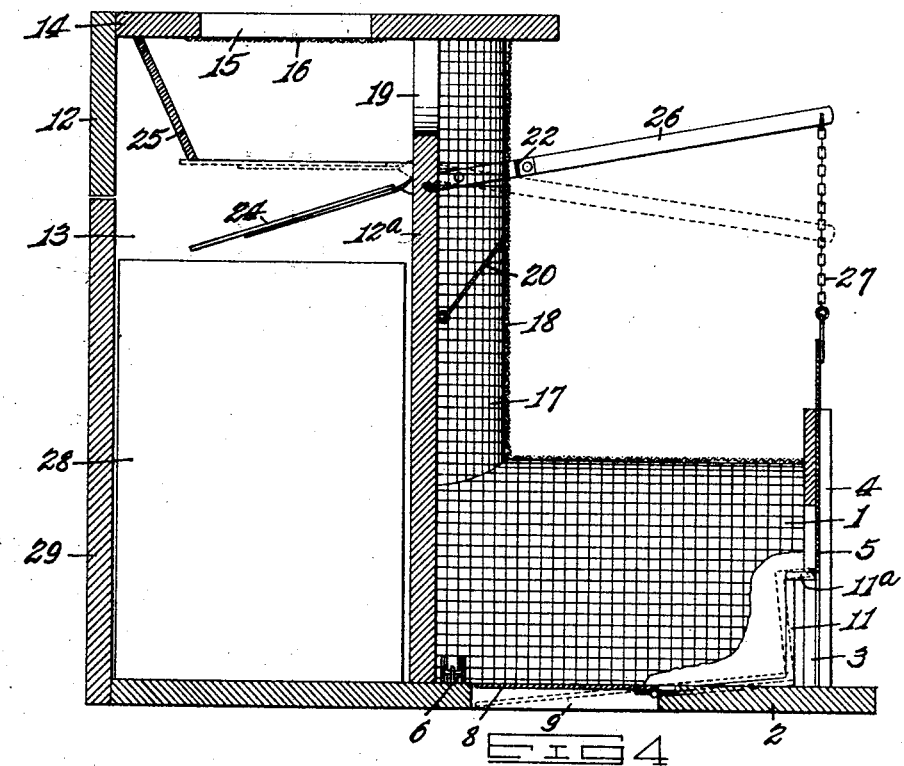
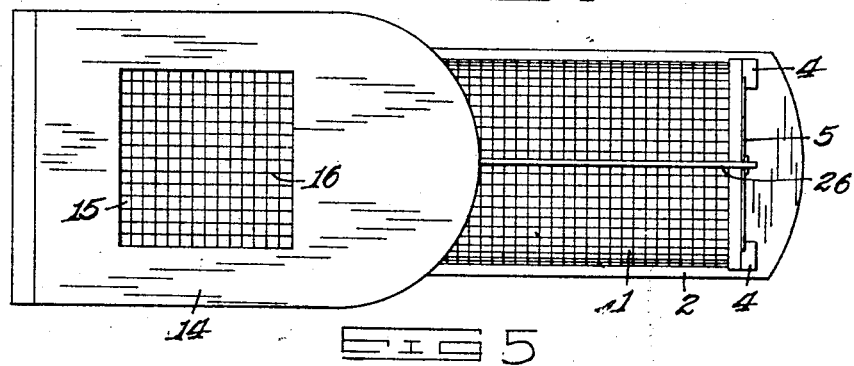
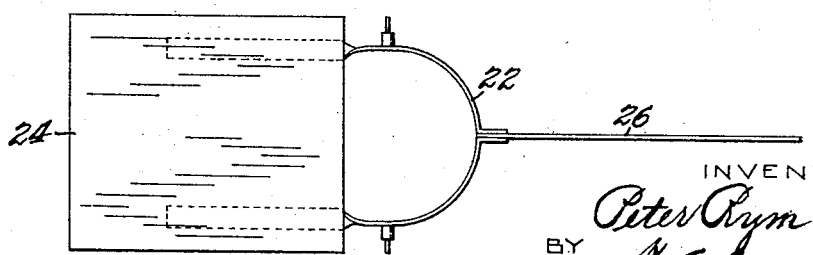

Patented Oct. 14, 1930

1,778,403

UNITED STATES PATENT OFFICE

PETER RYM, OF YORKVILLE, OHIO

ANIMAL TRAP

Application filed February 4, 1928. Serial No. 251,917.

This invention relates broadly to animal traps, and has for its primary object to provide a device, hereinafter termed a mouse trap, adapted for trapping such animals as rats and mice, which, having been set initially, may, without manual resetting, be employed for trapping numerous such animals.

A further object is to provide a trap of the character mentioned, including an entrance door or gate which, following entrance therethrough of an animal, hereinafter termed a mouse, is adapted to be actuated by such mouse to assume closed position for preventing its escape from the trap.

A still further object is to provide, in a trap of the character mentioned, a chamber having in the upper part thereof a pivoted normally closed tilt-table which, when the weight of a mouse is imposed thereon, is thereby actuated to swing to a downwardly inclined position for projecting such mouse into the lower portion of said chamber.

And a still further object is to provide, in a structure of this character, means intermediate the tilt-table and the entrance gate whereby shifting movement of the former to its downwardly inclined position, as aforesaid, actuates the latter to assume its open position for admitting another mouse to the trap.

In describing the invention in detail, reference is herein had to the accompanying drawings, in which—

Figure 1 is a side elevation of the invention;

Figure 2 is a front end elevation of the same;

Figure 3 is a horizontal section on line 3—3, Fig. 1, showing the gate supporting and tripping mechanism;

Figure 4 is a central longitudinal section of the invention;

Figure 5 is a top plan view of the same; and—

Figure 6 is a top plan view of the pivoted rocker and tilt-table carried thereby.

Referring to said drawings, 1 designates generally an enclosure, preferably of wire cage form, having a suitable base or floor 2 and constituting an entrance chamber to which access is had at its outer end through a gateway 3 provided between its opposite side walls, or between upright frame members 4 which form guides for a vertically slidable gate 5. Located at a suitable point within said chamber, as adjacent to the inner end of the latter, is a bait holder 6 of any appropriate form, access to which for the application of bait may be had through a suitable form of shiftable closure, as the hinged door 7, provided in a side wall of said chamber.

Provided in or on the floor 2 in a suitable location, preferably adjacent to and outward with respect to the position of the bait holder 6, is a sheet-metal platform 8 which, as herein shown, overlies an opening 9 provided in said floor. Said platform, which substantially corresponds in shape and dimensions with said opening 9, has its outer end hinged to the floor and is normally supported, as by a suitable spring 10, in the plane of the top surface of the floor, as shown in full lines in Fig. 4, and is movable to a downwardly and forwardly inclined position within said opening, as shown in dotted lines in said figure.

A rod or wire 11 has one end rigidly mounted on the outer end of the platform 8 adjacent to a lateral edge of the latter and extends outwardly to a point adjacent to one of the frame members, or posts, 4 and thence extends upwardly and has an angularly disposed terminal arm 11ª. In the horizontal position of said platform, the end of said arm 11ª is projected outwardly through the gateway 3 and occupies underlying supporting relation to the then elevated gate 5. When said platform is tipped downwardly, as when the weight of a mouse is imposed thereon, said arm is withdrawn from such supporting relation to the gate, allowing the latter to gravitate to gateway-closing position for preventing the escape of the mouse.

Located forwardly with respect to the entrance chamber 1 is an upright casing 12, herein shown as rectangular in horizontal section, which has a height exceeding that of said chamber. Said casing encloses a chamber 13, hereinafter termed the main chamber, having a top or cover 14 which is preferably provided with a sight opening 15 closed by a wire netting 16.

An upright tubular passage 17 of substantially semi-cylindrical form and closed at its upper end is provided along the casing wall 12ª which is next adjacent to the entrance chamber 1. Said passage, preferably formed by wire netting 18 attached to said wall 12ª, constitutes a runway leading from the inner end of said entrance chamber to a hole or opening 19 provided in said wall adjacent to the upper end of the latter. Said opening forms a passageway through which a mouse may find entrance to the main chamber 13.

Pivotally mounted upon the wall 12ª at a suitable elevation within said runway 17 is one edge of a flap-like gate or valve 20 which normally occupies an upwardly inclined position closing said runway. While said valve may readily be moved to an out-of-the-way position by an ascending mouse, it effectually obstructs said passage against return of the mouse when the latter has passed thereby.

Pivotally mounted on brackets 21 attached to the wall 12ª at opposite sides of the runway 17 below the level of the opening 19 are the substantially parallel members of a yoke 22 which occupies straddling relation to said runway. Said yoke, which constitutes a part of a pivoted rocker, has its said members projected through slots 23 provided therefor in said wall. The projecting ends of said yoke members have rigidly mounted thereon a plate 24, hereinafter termed a tilt-table, which is adapted normally to occupy horizontal position in which, complemented by a suitably arranged wall or partition 25, it separates said main chamber 13 into upper and lower compartments.

Rigidly attached to the yoke 22 at the side opposite the tilt-table and complementing said yoke in the formation of said rocker, is one end of a lever arm 26, from the opposite end of which the entrance gate 5 is suspended, as by a chain 27. The combined weights of said arm 26 and said gate 5 normally overbalance the weight of the tilt-table 24 and, consequently, when said gate is otherwise unsupported, as when the rod treminal 11ª is withdrawn, the tilt-table is held in its horizontal position. However, when the weight of a mouse, entering through the opening 19, is imposed thereon, said tilt-table is thereby tipped downwardly to such an inclination that the mouse is projected therefrom into the lower compartment which may, and preferably does, have seated therein a container 28 partially filled with water within which the mouse is received. The aforesaid tipping of said tilt-table effects elevation of the entrance gate 5 to such height that the rod terminal 11ª is permitted to assume supporting relation to said gate, thus resetting the trap.

A hinged door 29 is herein shown in one of the walls of the casing 12, the same closing a doorway through which the container 28 may be introduced and removed.

What is claimed is—

1. An animal trap comprising an entrance compartment having a sliding door, a main compartment for receiving substance to kill the trapped animal, a passageway leading from said entrance compartment to the main compartment, a bait holder in the entrance compartment, a hinged platform between the bait holder and the entrance to said compartment partially covering the floor of the compartment and flush therewith and appreciably spaced from the entrance thereto, and a rod adjacent a side wall of the compartment and connected with the hinged platform and having an L-shaped terminal arm out of the way of the entrance and engaging the door in its open position to release the door when the plate is depressed by the weight of the animal.

2. An animal trap comprising an entrance compartment having a sliding door, a main compartment for receiving substance to kill the animal trapped, a passageway leading from said entrance compartment to the main compartment, a bait holder in the entrance compartment, a hinged platform between the bait holder and entrance partially covering the floor of the entrance compartment and flush therewith, and appreciably spaced from the entrance thereto to permit the animal to completely enter before stepping upon the platform, a rod adjacent the side wall of the compartment and connected with the hinged platform and having an L-shaped terminal arm out of the way of the entrance and engaging the door in its open position to release the door when the plate is depressed by the weight of an animal, and a partition in the main compartment forming a relatively small separate compartment at the point of entrance of the passageway to the main compartment, a pivoted plate forming a floor for said separate compartment, and a lever arm connected at one end with the door and being provided with a U-shaped terminal fitting at its other end the arms of which extend about and outside of the passageway and through the wall of the main compartment and are attached to the pivoted plate for raising the door when the plate is depressed to precipitate the trapped animal into the main compartment.

In testimony whereof, I affix my signature.

PETER RYM.